US012131638B2

(12) United States Patent
Frank et al.

(10) Patent No.: US 12,131,638 B2
(45) Date of Patent: Oct. 29, 2024

(54) METHOD AND DEVICE FOR PREDICTING A SWITCHING STATE AND/OR A SWITCHING TIME OF A SIGNALING SYSTEM FOR TRAFFIC CONTROL

(71) Applicant: Yunex GmbH, Munich (DE)

(72) Inventors: Harald Frank, Hoehenkirchen-Siegertsbrunn (DE); Felix Rudolph, Munich (DE); Michel Tokic, Tettnang (DE); Anja von Beuningen, Erfurt (DE)

(73) Assignee: Yunex GmbH, Munich (DE)

( * ) Notice: Subject to any disclaimer, the term of this patent is extended or adjusted under 35 U.S.C. 154(b) by 105 days.

(21) Appl. No.: 17/638,955

(22) PCT Filed: Aug. 4, 2020

(86) PCT No.: PCT/EP2020/071848

§ 371 (c)(1),
(2) Date: Feb. 28, 2022

(87) PCT Pub. No.: WO2021/037494

PCT Pub. Date: Mar. 4, 2021

(65) Prior Publication Data

US 2022/0406180 A1 Dec. 22, 2022

(30) Foreign Application Priority Data

Aug. 30, 2019 (DE) ........................ 10 2019 213 106

(51) Int. Cl.
*G08G 1/0967* (2006.01)
*G08G 1/01* (2006.01)
*G08G 1/07* (2006.01)

(52) U.S. Cl.
CPC ..... *G08G 1/096725* (2013.01); *G08G 1/0116* (2013.01); *G08G 1/07* (2013.01); *G08G 1/096775* (2013.01)

(58) Field of Classification Search
CPC .. G08G 1/096725; G08G 1/0116; G08G 1/07; G08G 1/096775; G08G 1/0129;
(Continued)

(56) References Cited

U.S. PATENT DOCUMENTS

2016/0293006 A1* 10/2016 Bauer .................. G08G 1/0129
2017/0084172 A1* 3/2017 Rolle .................... G08G 1/0129
(Continued)

FOREIGN PATENT DOCUMENTS

DE 102004039854 A1 3/2006
DE 102005053461 A1 5/2007
(Continued)

*Primary Examiner* — Hirdepal Singh
(74) *Attorney, Agent, or Firm* — Laurence A. Greenberg; Werner H. Stemer; Ralph E. Locher

(57) ABSTRACT

A method predicts a switch state and/or a switch time point of a signaling system. The method includes collecting first and second state data, the first and second state data influencing the switch state and/or switch time point. The collection of the first state data includes reading of state data from a signaling system control device of the signaling system by a signaling system interface. The collection of the second state data includes reading in of the state data. A prediction model is provided and configured to make a prediction of the switch time point and/or the switch state of the signaling system based on first and second state data. The switch state and/or the switch time point of the signaling system is predicted via the prediction model using the first and second state data. The predicted switch state and/or switch time point of the signaling system is outputted.

20 Claims, 2 Drawing Sheets

(58) Field of Classification Search
CPC ................. G08G 1/0145; G08G 1/096; G08G 1/096716; G08G 1/096758; G08G 1/096783
USPC .......................................................... 340/907
See application file for complete search history.

(56) References Cited

U.S. PATENT DOCUMENTS

| | | | | |
|---|---|---|---|---|
| 2018/0096595 | A1 | 4/2018 | Janzen et al. | |
| 2018/0157975 | A1* | 6/2018 | Hahn | G08G 1/0129 |
| 2018/0181884 | A1* | 6/2018 | Rolle | G08G 1/0141 |
| 2018/0211523 | A1* | 7/2018 | Ashida | G08G 1/0141 |
| 2019/0122548 | A1* | 4/2019 | Sakuma | G08G 1/08 |
| 2020/0327803 | A1 | 10/2020 | Hobohm et al. | |
| 2021/0365769 | A1* | 11/2021 | Chae | G06F 18/214 |

FOREIGN PATENT DOCUMENTS

| | | | |
|---|---|---|---|
| DE | 102014006551 | A1 | 11/2015 |
| DE | 102015217529 | A1 | 3/2017 |
| DE | 102017213350 | A1 | 2/2019 |
| DE | 102017223579 | A1 | 6/2019 |
| EP | 3144918 | A1 | 3/2017 |
| EP | 3333823 | A1 | 6/2018 |
| EP | 3438946 | A2 | 2/2019 |

* cited by examiner

METHOD AND DEVICE FOR PREDICTING A SWITCHING STATE AND/OR A SWITCHING TIME OF A SIGNALING SYSTEM FOR TRAFFIC CONTROL

FIELD AND BACKGROUND OF THE INVENTION

The invention relates to a method and a device for predicting a switching state and/or a switching time of a signaling system for traffic control, a computer program product, a computer-readable storage medium, and also a system composed of such a device and a vehicle.

Signaling systems, in particular light signaling systems, are used for example at traffic intersections and there they can regulate traffic, for example road traffic. For this purpose, stop or proceed signals can be output by way of signal groups, for example by means of lights. In general, such signaling systems are controlled by means of a control unit. In order to control a vehicle that is part of the traffic, at the present time either the signals output by the signaling system are taken into account directly or a switching state and/or a switching time of the light signaling system are/is predicted and this prediction is taken into account in the control of the vehicle.

SUMMARY OF THE INVENTION

The object of the present invention is to improve a prediction quality of a switching state and/or a switching time of a signaling system.

This object is achieved by means of the features described in the independent claims. Developments are specified in the dependent patent claims.

A method for predicting a switching state and/or a switching time of a signaling system comprises the following method steps:

- acquiring first state data and second state data, wherein the first state data and second state data influence the switching state and/or the switching time of the signaling system, wherein acquiring the first state data comprises reading out state data of a signaling system controller of the signaling system by means of a signaling system interface, wherein acquiring the second state data comprises reading in state data provided via a communication interface;
- providing a prediction model configured to make a prediction of the switching time and/or the switching state of the signaling system depending on the first state data and second state data;
- predicting the switching state and/or the switching time of the signaling system by means of the prediction model on the basis of the first state data and second state data; and
- outputting the predicted switching state and/or switching time of the signaling system.

The method can be computer-implemented, in particular. This means, in particular, that the method can be carried out on a computer. In this case, the first state data relate to a state of the signaling system. The second state data relate to a state of a vehicle traveling past the signaling system and/or to general data of the surroundings.

By virtue of the fact that only state data which influence the switching state and/or the switching time of the signaling system are taken into account, a prediction quality can advantageously be improved.

In association with the invention, a "signaling system for traffic control" can be understood to mean, in particular, a light signaling system for controlling road traffic. The prediction can be used in particular for indicating a remaining time until the switching time of the next switching state. Moreover, an optimization of automatic start-stop mechanisms for drive motors and/or of the traffic regulation can be carried out on the basis of the prediction. Furthermore, the prediction can be used for energy recovery in a vehicle by optimizing the speed of travel.

In one embodiment, the first state data comprise control data of the signaling system. These can be in particular input data and/or output data of the signaling system controller. In this case, the input data can comprise for example data from detectors assigned to the signaling system or traffic data which can be accessed by the signaling system controller. The output data can comprise for example a signal group state, i.e. whether specific parts of the signaling system are outputting stop- or proceed-indicating signals (showing "red", showing "amber" or showing "green"). Furthermore, the output data can also comprise information about a cycle time, a cycle second and/or a time stamp. The signaling system interface advantageously enables the method to be employed for an existing signaling system, without the signaling system controller having to be exchanged. This advantageously enables a possibility of provision for prediction data of a signaling system without expensive investment in the corresponding infrastructure.

In one embodiment of the method, a control recommendation for the signaling system is determined on the basis of the predicted switching state and/or switching time, and the control recommendation is output to the signaling system via the signaling interface or the signaling system controller. Cost-effective retrofitting of existing infrastructure is made possible by this means, too.

In one embodiment of the method, remote maintenance of the signaling system controller is carried out via the signaling system interface. This, too, enables cost-effective retrofitting of the existing infrastructure, for example if, after the installation of the signaling system, it turns out that an alternative control program should be installed on the signaling system controller and the signaling system controller provides a corresponding interface.

In one embodiment of the method, the second state data read in via the communication interface comprise data from external sensors and/or data from internet-based third-party providers and/or data from roadside units for obtaining vehicle data. These data sources mentioned can provide second state data which influence the switching state and/or switching time. The provision of these data enables a prediction quality of the prediction of switching time and/or switching state to be improved further.

In one embodiment of the method, the predicted switching state and/or switching time are/is output to a vehicle. Provision can be made for the predicted switching state and/or switching time to be output to a plurality of vehicles. As a result, advantageously, information about future switching states and/or switching times of the signaling system can be made available to the vehicles and a driver of the vehicle can already react accordingly before the signaling system switches over.

In one embodiment of the method, a confidence interval for the predicted switching state and/or switching time is output. This makes it possible, besides the prediction, also to output information about a prediction quality and to adapt control performed on the basis of the prediction with reference to the prediction quality.

In one embodiment of the method, acquiring the first state data and/or second state data is repeated after a predefined time duration. In this case, the predefined time duration is a maximum of five seconds, preferably a maximum of one second, and in particular preferably a maximum of one tenth of a second. This advantageously enables a prediction of the switching state and/or switching time virtually in real time, whereby many future applications such as, for example, the use of the predicted switching state and/or switching time in vehicles configured for automated driving will be made possible in the first place.

In one embodiment of the method, the prediction model is provided by a central computing unit via a cloud interface. A simple provision of the prediction model can be achieved as a result.

In one embodiment, the first state data and/or second state data are output to the central computing unit via the cloud interface. This enables the state data of the signaling system to be forwarded to further signaling systems via the central computing unit, wherein the state data of the signaling system can be used to make a prediction of the switching state and/or switching time of further signaling systems.

In this case, it can be provided that the prediction model is trained by means of the state data forwarded to the central computing unit via the cloud interface and the result of this training process is provided as prediction model via the cloud interface. This enables the computationally intensive process of training the prediction model to be outsourced to the central computing unit having high computing power.

In one embodiment of the method, a termination command is received via the cloud interface. The outputting of the predicted switching state and/or switching time of the signaling system is ended after the termination command has been received. As a result, if the central computing unit establishes that the prediction model is inadequate, outputting of the switching states and/or switching times calculated by means of the inadequate prediction model can be prevented.

In one embodiment of the method, after the termination command has been received, a resumption command is received via the cloud interface, and after the resumption command has been received, the outputting of the predicted switching state and/or switching time of the signaling system is resumed. This makes it possible to resume the outputting of the predicted switching state and/or switching time of the signaling system, for example if an improved prediction model has been provided or if it has been established that the available first state data and second state data do not enable an improved prediction model.

In one embodiment of the method, the prediction model is trained by means of the first state data and second state data. This enables the prediction model to be progressively improved, without relying on access to the central computing unit.

In one embodiment of the method, the prediction model is data-driven. In a data-driven prediction model, it is possible to evaluate in particular many state data over a relatively long time horizon and to correlate them with past switching states and/or switching times in order thus to achieve an improvement of the prediction model. The data-driven prediction model may require in particular a constant amount of input variables. State data from a multiplicity of road users can thus be transformed into traffic flow data, which are independent of the number of road users from which state data are acquired, and in this way can be transferred to the data-driven prediction model. The data-driven prediction model can be embodied in particular as a neural network, such as e.g. as a recurrent neural network. Neural networks are in particular parametric functions which can be trained in a data-driven manner by way of (stochastic) gradient descent methods. A recurrent neural network enables in particular an integrated prediction of a switching state and a switching time. In this case, the state data can comprise both the first state data and the second state data.

In one embodiment of the method, a vehicle is controlled on the basis of the predicted switching state and/or switching time. In this case, the control of the vehicle can comprise in particular an automated steering movement and/or an automated acceleration of the vehicle. In this case, acceleration should be understood to mean both a positive and a negative change in velocity, that is to say that the term acceleration also encompasses deceleration of the vehicle.

The invention furthermore comprises a device having a computing unit, wherein the computing unit is configured to carry out one of the methods according to the invention. For this purpose, the device has a signaling system interface enabling access to a signaling system controller in order to acquire the first state data. In addition, the device has a communication interface, wherein second state data such as, for example, data from external sensors and/or data from internet-based third-party providers and/or data from roadside units are provided via the communication interface. Furthermore, the device can have a cloud interface, wherein the prediction model can be provided via the cloud interface and the device can be configured to forward the state data to a central computing unit via the cloud interface. The device can be used in particular for extending an existing signaling system with an existing signaling system controller. Alternatively, the device can also be assigned to the signaling system controller and be configured for example as a dedicated circuit board of the signaling system controller. In this case, the cloud interface can be configured as a radio module, wherein the term radio module is intended to encompass all customary wireless data transfer possibilities. In particular, the cloud interface can be configured as an LTE modem or a WLAN interface. The communication interface can likewise be configured as a radio module. In this case, provision can be made for communication interface and cloud interface to use the same radio module alternately or simultaneously. However, the communication interface can also be a wired interface, in particular to a roadside unit set up in the region of the signaling system for the purpose of obtaining vehicle data or to external sensors. The signaling system interface can likewise be embodied in wired fashion, but also in a manner using radio.

The invention furthermore comprises a computer program product, comprising program code, wherein executing the program code on a computing unit causes the computing unit to carry out the method. The invention furthermore comprises a computer-readable storage medium comprising such a computer program product.

The invention additionally comprises a system composed of a device according to the invention and a vehicle. In this case, the vehicle is configured to receive the predicted switching state and/or switching time and has a vehicle controller configured to control a vehicle movement of the vehicle on the basis of the switching state and/or switching time. In this case, the vehicle movement can comprise in particular a steering movement and/or an acceleration of the vehicle, where the term acceleration is intended once again to be defined as already described above.

Alternatively, the vehicle can have a display device that can output information about the predicted switching state and/or switching time to a driver of the vehicle.

The invention furthermore comprises a method for evaluating a prediction model, comprising the following steps:

- providing a previous prediction model, wherein the previous prediction model is output to a device via a computing unit interface;
- reading first state data and/or second state data into a central computing unit via the computing unit interface;
- comparing a switching state and/or switching time calculated by means of the previous prediction model with an actual switching state and/or switching time;
- outputting a termination command via the computing unit interface if the calculated switching state and/or switching time deviates from the actual switching state and/or switching time to an excessively great extent.

This evaluation method can be used if for example one or a plurality of signaling systems is/are present in a traffic network and first state data and second state data assigned to the signaling systems are communicated to the central computing unit after a prediction model has initially been provided by the central computing unit. If it then emerges that a switching state and/or switching time calculated by means of the previous prediction model deviates from an actual switching state and/or switching time, it can be expedient to interrupt the outputting of the predicted switching state and/or switching time of the signaling system. This can be initiated by the central computing unit by means of the termination command being output.

In one embodiment of the method, the prediction model is subsequently trained on the basis of the first state data and/or second state data, wherein after the prediction model has been trained, said prediction model is stored in a memory. This makes it possible to provide a newly trained prediction model by means of the current state data.

In one embodiment of the method, a check is made to ascertain whether the newly trained prediction model is better suited to predicting the switching state and/or switching time than the previous prediction model. The trained prediction model and a resumption command are subsequently output via the computing unit interface if the trained prediction model is better suited to predicting the switching state and/or switching time than the previous prediction model. If the trained prediction model is worse suited to predicting the switching state and/or switching time than the previous prediction model, a resumption command is output via the computing unit interface.

The prediction model can be data-driven. The data-driven prediction model can be embodied in particular as a neural network.

This method for training a prediction model can also be implemented in the form of a computer program product or computer-readable storage medium. Furthermore, a central computing unit can be configured to carry out this method.

The above-described properties, features and advantages of this invention and the way in which they are achieved will become clearer and more clearly understood from the explanations of the following, greatly simplified, schematic illustrations of preferred exemplary embodiments. Here in a schematic illustration in each case:

DETAILED DESCRIPTION OF THE INVENTION

Figure 1:
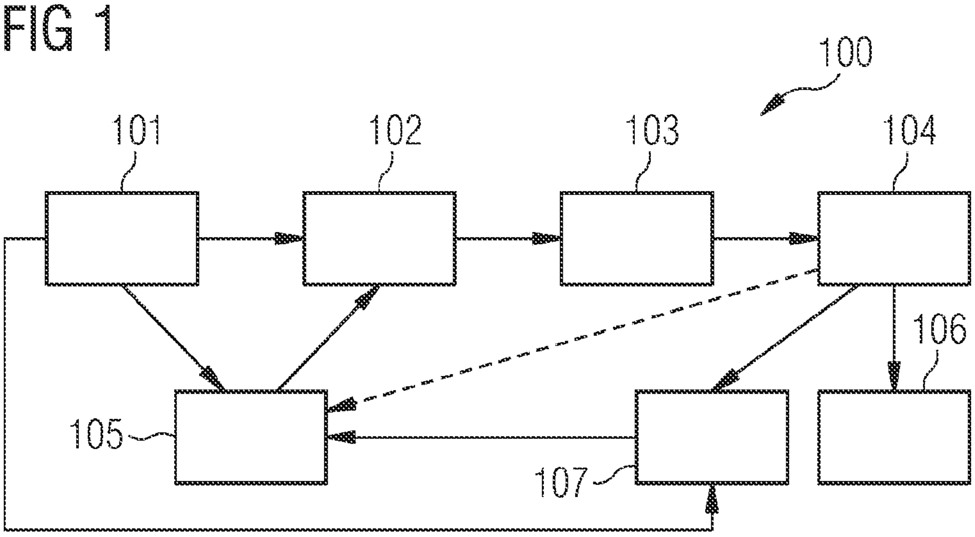
FIG. 1 shows a flow diagram of a method according to the invention.

FIG. 1 shows a flow diagram 100 of a method according to the invention for predicting a switching state and/or a switching time of a signaling system. In an acquisition step 101, first state data and second state data are acquired, wherein the first state data and the second state data acquired in the acquisition step 101 influence the switching state and/or the switching time. Acquiring the first state data comprises reading out state data of a signaling system controller of the signaling system by means of a signaling system interface. Acquiring the second state data comprises reading in state data provided via a communication interface. In a subsequent provision step 102, a prediction model is provided, said prediction model being configured to make a prediction of the switching time and/or the switching state of the signaling system depending on the first state data and second state data. In a prediction step 103 subsequent thereto, the switching state and/or the switching time of the signaling system are/is predicted by means of the prediction model on the basis of the first state data and second state data. In an outputting step 104 subsequent thereto, the predicted switching state and/or switching time of the signaling system is output. FIG. 1 likewise illustrates three further optional method steps 105, 106, 107. In a control step 106, a vehicle is controlled on the basis of the predicted switching state and/or switching time of the signaling system. In a training step 105, the prediction model is trained on the basis of the acquired first state data and/or second state data. In this case, provision can be made for always carrying out this training, such that the training step 105 is carried out directly after the outputting step 104. This is indicated by means of a dashed arrow from the outputting step 104 to the training step 105. In the training step, the first state data and second state data acquired in the acquisition step 101 can be used for training the prediction model. The newly trained prediction model can then be provided in the provision step 102. Alternatively, as illustrated by means of solid arrows in FIG. 1, firstly an evaluation step 107 can be carried out, which involves evaluating whether a switching state and/or switching time calculated by means of the previous prediction model corresponds to an actual switching state and/or switching time, and the training step 105 is carried out only if this is not the case. Provision can be made here either for comparing one actual switching state and/or switching time with one calculated switching state and/or switching time or for comparing a plurality of actual switching states and/or switching times with a plurality of calculated switching states and/or switching times. For this purpose, it is possible to have recourse to the first state data and second state data acquired in the acquisition step 101.

Figure 2:
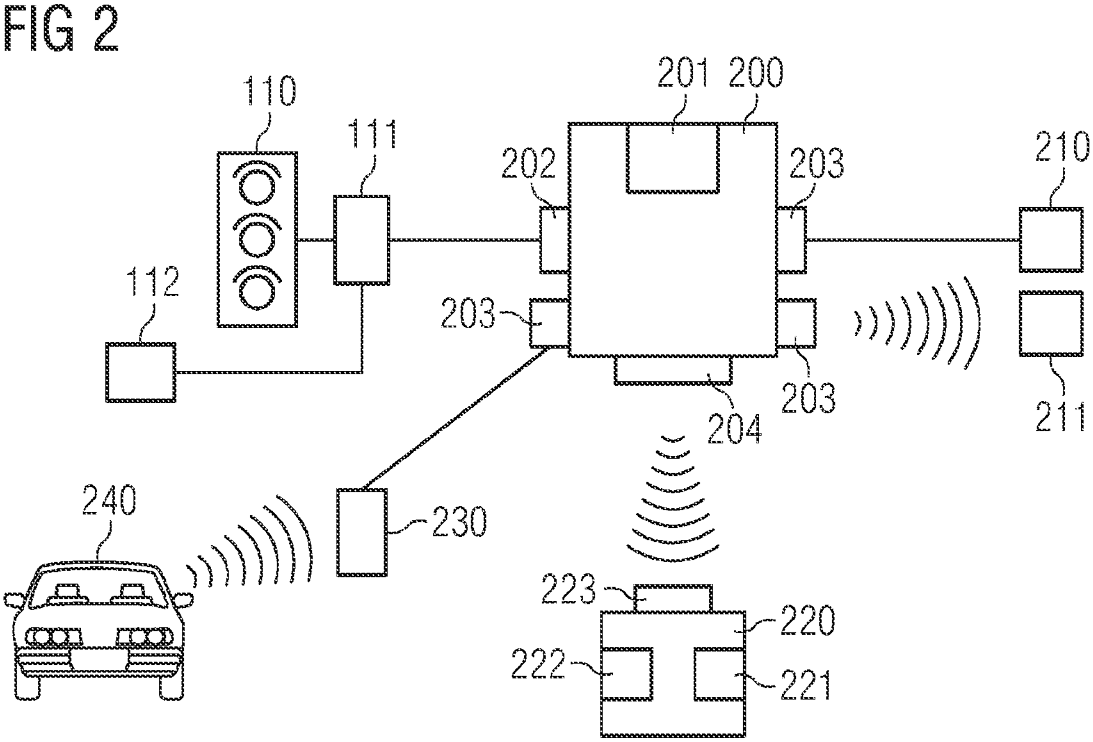
FIG. 2 shows a device for carrying out the method according to the invention.

FIG. 2 shows a device 200 for carrying out the method illustrated in FIG. 1. The device 200 comprises a computing unit 201. Furthermore, the device 200 comprises a signaling system interface 202, by which the device 200 is connected to a signaling system controller 111 of a signaling system 110. Furthermore, the device 200 comprises a plurality of communication interfaces 203. One communication interface 203 is connected to an external sensor 210. A further communication interface 203 is connected to an internet-based third-party provider 211. A further communication interface 203 is connected to a roadside unit 230. The device 200 is connected to an external central computing unit 220 via a cloud interface 204. For this purpose, the central computing unit 220 has a computing unit interface 223 and also a processor 221 and a memory 222. The connection of the communication interface 203 to the external sensor 210 is illustrated as a wired connection, as is the connection of the communication interface 203 to the roadside unit 230. The connection to the internet-based third-party provider 211 is illustrated as a radio connection. Alternatively, the communication connections of the communication interfaces 203 can each be wired or wireless, and both variants are intended in each case to be covered by the scope of protection of the invention. The communication interfaces 203 can also be embodied jointly as one communication interface, for example to the internet. The cloud interface 204 and one or more of the communication interfaces 203 can likewise be embodied as one physical interface. The roadside unit 230 is connected to a vehicle 240 by means of radio connection. Vehicle data of the vehicle 240 can thereby be forwarded to the roadside unit 230 and via the communication interface 203 to the device 200.

Acquiring the first state data in the acquisition step 101 includes reading out the first state data of the signaling system controller 111 by means of the signaling system interface 202. As a result, first state data which are available to the signaling system controller 111 for controlling the signaling system 110 can be used for predicting the switching state and/or switching time. In this case, the first state data can comprise control data of the signaling system 110 and include for example data of a signaling system detector 112 connected to the signaling system controller 111. In this case, the signaling system detector 112 can be configured to capture a traffic flow, to detect vehicles or to acquire other data in the region of the signaling system 110. The signaling system controller 111 can be configured to alter switching cycles, switching states and/or switching times of the signaling system 110 on the basis of these data of the signaling system detector 112. The control data can additionally comprise further data available to the signaling system controller 111, for example data that are provided to the signaling system controller 111 via the internet. Furthermore, the signaling system control data can also include output data such as, for example, the switching states of the signaling system 110.

Acquiring the second state data in the acquisition step 101 includes reading in second state data provided via one of the communication interfaces 203, for example from an external sensor 210 and/or the internet-based third-party provider 211 and/or the roadside unit 230.

In one exemplary embodiment, a control recommendation for the signaling system 110 is determined on the basis of the predicted switching state and/or switching time and the control recommendation is output to the signaling system 110 via the signaling system interface 202 and in particular the signaling system controller 111.

In one exemplary embodiment, remote maintenance of the signaling system controller 111 can be carried out via the signaling system interface 202.

Overall, provision can be made here for incorporating into the prediction model of the device 200 the first state data and second state data provided via the signaling system interface 202 and/or the communication interfaces 203 and for determining the predicted switching state and/or switching time on the basis of said first state data and second state data. In this case, it can be provided that the prediction model has been correspondingly trained on the basis of first state data and second state data recorded earlier or acquired earlier.

Providing the prediction model in the provision step 102 can be effected by the central computing unit 220 by means of transfer via the cloud interface 204. In this case, provision can be made for the first state data and second state data determined in the acquisition step 101 to be transferred to the central computing unit 220 via the cloud interface 204 and for the training of the prediction model to be carried out on the central computing unit 220. This makes it possible in particular to make available a lower computing power to the computing unit 220 assigned to the device 200 and to equip the central computing unit 220 with a powerful processor 221. Alternatively, the prediction model can also be trained by the computing unit 201 of the device 200.

In one exemplary embodiment, by means of the device 200, a termination command is received via the cloud interface 204 and the outputting of the predicted switching state and/or switching time of the signaling system 110 is ended after the termination command has been received. In one exemplary embodiment, after the termination command has been received, a resumption command is received via the cloud interface 204, and after the resumption command has been received, the outputting of the predicted switching state and/or switching time of the signaling system 110 is resumed.

In one exemplary embodiment, the predicted switching state and/or switching time is output to a vehicle 240 in the outputting step 104. This can be effected for example via the roadside unit 230, but also via other communication paths.

In one exemplary embodiment, a confidence interval for the predicted switching state and/or switching time is likewise concomitantly output in the outputting step 104, as a result of which additional information about the prediction quality is available.

In one exemplary embodiment, acquiring the first state data and/or second state data is effected in the acquisition step 101 and is repeated after a predefined time duration. In this case, provision can be made for the predefined time duration to be a maximum of five seconds, preferably a maximum of one second, and in particular preferably a maximum of one tenth of a second. As a result, sufficiently accurate state data, or state data with a sufficiently good temporal resolution, are available and can be used to carry out the prediction step 103. Furthermore, the good temporal resolution of the state data can be helpful during the training of the prediction model.

In one exemplary embodiment, the prediction model is data-driven. In this case, the data-driven prediction model can be embodied in particular as a neural network.

A computer program, comprising program code, runs on the computing unit 201 of the device 200, wherein executing the program code causes the computing unit 201 to carry out the method according to the invention.

The signaling system interface 202, the communication interfaces 203 and the cloud interface 204 are illustrated as individual interfaces in each case in FIG. 2, but can be embodied as a single interface. It can be provided that the signaling system interface 202 serves to assign the device 200 to the signaling system controller 111 of an existing signaling system 110 and thus constitutes a cost-effective possibility for assigning a device for making a switching time and/or switching state prediction to the signaling system 110. As a result, existing road infrastructure can be adapted to the existing communication requirements in a cost-effective manner.

Figure 3:
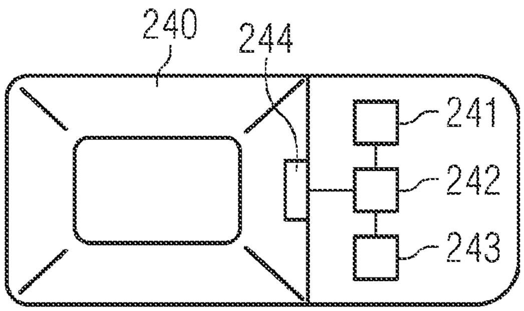
FIG. 3 shows a vehicle.

FIG. 3 shows a vehicle 240 having a vehicle communication interface 241, a vehicle computing unit 242 and also a device for performing a driving function 243 in an automated manner, and a display device 244. In this case, the device for performing a driving function 243 in an automated manner and the display device 244 can both be provided or provision can be made for omitting one of the two devices. The predicted switching state and/or switching time can be output via the display device 244 and thus made available to a driver of the vehicle 240. A vehicle movement of the vehicle 240 can be controlled by way of the device for performing a driving function 243 in an automated manner, wherein the vehicle movement can comprise a steering movement and/or an acceleration of the vehicle 240. In this case, acceleration once again encompasses an increase but also a decrease in a vehicle velocity of the vehicle 240.

The invention likewise comprises a system consisting of the device 200 from FIG. 2 and the vehicle 240 from FIG. 3.

Figure 4:
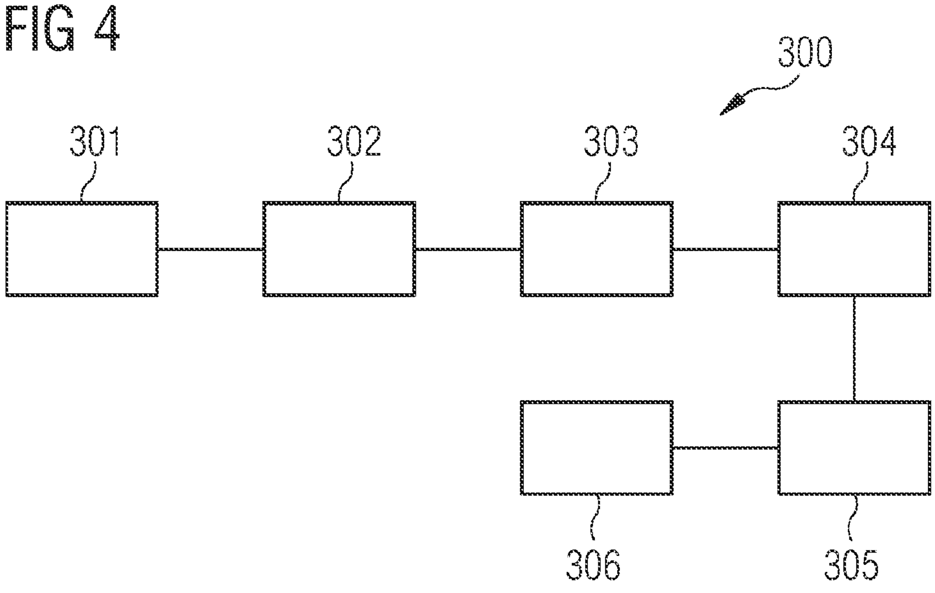
FIG. 4 shows a flow diagram of an evaluation method.

FIG. 4 shows a flow diagram 300 of a method for evaluating a prediction model. In a provision step 301, a previous prediction model is provided, wherein the previous prediction model is output to a device 200 via a computing unit interface 223. In a read-in step 302 subsequent thereto, first state data and/or second state data are read into a central computing unit 220 via the computing unit interface 223. In a subsequent comparison step 303, a switching state and/or switching time calculated by the means of the previous prediction model is compared with an actual switching state and/or switching time. Subsequently thereto, in an outputting step 304, a termination command is output via the computing unit interface 223 if the calculated switching state and/or switching time deviates from the actual switching state and/or switching time to an excessively great extent.

In one exemplary embodiment, not just one calculated switching state and/or switching time is compared with one actual switching state and/or switching time, rather a plurality of actual switching states and/or switching times are compared with a plurality of calculated switching states and/or switching times.

FIG. 4 likewise illustrates an optional training step 305. In the training step 305, the prediction model is trained on the basis of the first state data and/or second state data, wherein after the prediction model has been trained, a newly trained prediction model is stored in the memory 222. An optional checking step 306 is additionally provided, in which a check is made to ascertain whether the newly trained prediction model is better suited to predicting the switching state and/or switching time than the previous prediction model. Subsequently, in the checking step, either the newly trained prediction model and a resumption command are output via the computing unit interface 223 if the trained prediction model is better suited to predicting the switching state and/or switching time than the previous prediction model, or a resumption command is output via the computing unit interface 223 if the trained prediction model is worse suited to predicting the switching state and/or switching time than the previous prediction model.

A computer program, comprising program code, runs on the central computing unit 220, wherein executing the program code causes the computing unit 220 to carry out the method illustrated in FIG. 4.

Although the invention has been explained in greater detail on the basis of preferred exemplary embodiments, it is not restricted to them. In particular, a person skilled in the art can effect combinations of the features shown, without departing from the scope of protection of the invention.

The invention claimed is:

1. A method for predicting a switching state and/or a switching time of a signaling system for traffic control, which comprises the following method steps of:
- acquiring first state data and second state data, wherein the first state data and second state data influence the switching state and/or the switching time of the signaling system, wherein acquiring the first state data includes reading out state data of a signaling system controller of the signaling system by means of a signaling system interface, wherein acquiring the second state data includes reading in state data provided via a communication interface;
- providing a prediction model via a central computing unit via a cloud interface, the prediction model configured to make a prediction of the switching time and/or the switching state of the signaling system depending on the first state data and second state data;
- predicting the switching state and/or the switching time of the signaling system by means of the prediction model on a basis of the first state data and second state data;
- outputting a predicted switching state and/or switching time of the signaling system;
- receiving a termination command via the cloud interface and the outputting of the predicted switching state and/or switching time of the signaling system is ended after the termination command has been received; and
- outputting a confidence interval for the predicted switching state and/or switching time.

2. The method according to claim 1, wherein the first state data includes control data of the signaling system.

3. The method according to claim 1, which further comprises:
- determining a control recommendation for the signaling system on a basis of the predicted switching state and/or switching time; and
- outputting the control recommendation to the signaling system via the signaling system interface.

4. The method according to claim 1, which further comprises carrying out remote maintenance of the signaling system controller via the signaling system interface.

5. The method according to claim 1, wherein a second state data read in via the communication interface includes data from external sensors and/or data from internet-based third-party providers and/or data from roadside units for obtaining vehicle data.

6. The method according to claim 1, which further comprises outputting the predicted switching state and/or switching time to vehicles.

7. The method according to claim 1, which further comprises repeating the acquiring of the first state data and/or of the second state data after a predefined time duration, wherein the predefined time duration is a maximum of five seconds.

8. The method according to claim 1, which further comprises outputting the first state data and/or the second state data to the central computing unit via the cloud interface.

9. The method according to claim 1, wherein after the termination command has been received, a resumption command is received via the cloud interface, and after the resumption command has been received, the outputting of the predicted switching state and/or switching time of the signaling system is resumed.

10. The method according to claim 1, which further comprises training the prediction model by means of the first state data and/or the second state data.

11. The method according to claim 1, wherein the prediction model is data-driven.

12. The method according to claim 1, which further comprises controlling a vehicle on a basis of the predicted switching state and/or switching time.

13. A device, comprising:

a signaling system interface;

a communication interface; and a computing unit configured to carry out the method according to claim 1.

14. A non-transitory computer-readable storage medium having computer executable instructions for performing the method according to claim 1.

15. A system, comprising:

said device according to claim 13; and a vehicle configured to receive the predicted switching state and/or switching time, said vehicle having a vehicle controller configured to control a vehicle movement of said vehicle on a basis of the switching state and/or switching time.

16. A method for evaluating a prediction model, which comprises the following steps of:

providing a previous prediction model, the previous prediction model being output to a device via a computing unit interface;

reading first state data and/or second state data into a central computing unit via the computing unit interface;

comparing a switching state and/or a switching time calculated by means of the previous prediction model with an actual switching state and/or an actual switching time; and outputting a termination command via the computing unit interface if a calculated switching state and/or a calculated switching time deviates from the actual switching state and/or the actual switching time to a given extent.

17. The method according to claim 16, which further comprises subsequently training the prediction model on a basis of the first state data and/or the second state data, wherein after the prediction model has been trained, a newly trained prediction model is stored in a memory.

18. The method according to claim 17, which further comprises:

performing a check to ascertain whether the newly trained prediction model is better suited to predicting the switching state and/or the switching time than the previous prediction model;

outputting the newly trained prediction model and a resumption command via the computing unit interface if the newly trained prediction model is better suited to predicting the switching state and/or the switching time than the previous prediction model; and outputting the resumption command via the computing unit interface if the newly trained prediction model is worse suited to predicting the switching state and/or the switching time than the previous prediction model.

19. A central computing unit configured to carry out the method according to claim 16.

20. A non-transitory computer-readable storage medium having computer executable instructions for performing the method according to claim 16.

* * * * *